Dec. 28, 1937.   J. A. BARTOSZ   2,103,442
HANDLE AND SHANK THEREFOR
Filed Feb. 25, 1935
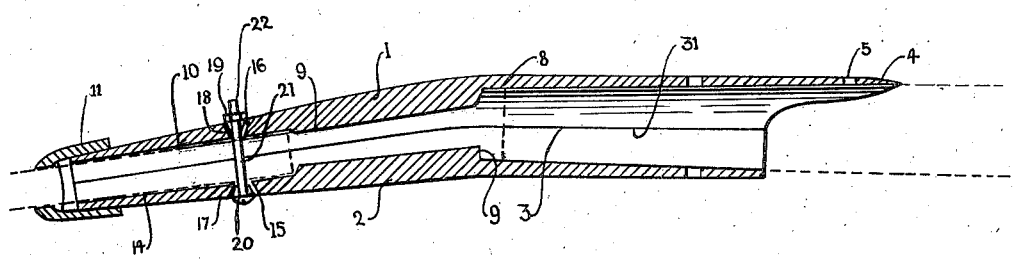
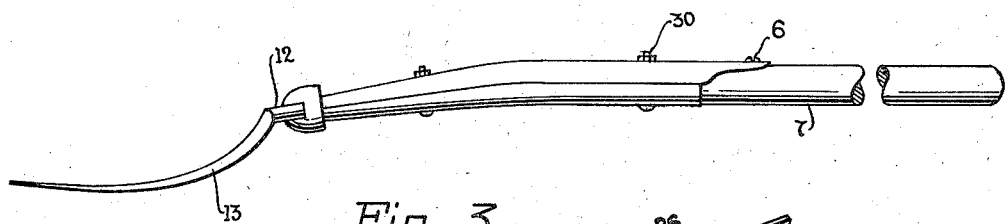
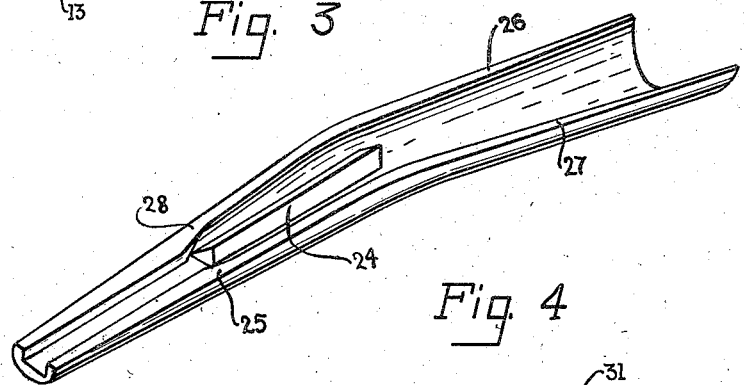
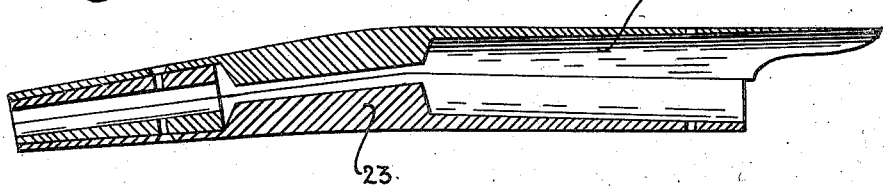
JOSEPH A. BARTOSZ
INVENTOR
ATTORNEY Patented Dec. 28, 1937

2,103,442

UNITED STATES PATENT OFFICE 2,103,442

HANDLE AND SHANK THEREFOR

Joseph A. Bartosz, Salem, Oreg., assignor of one-half to A. C. Burk, Salem, Oreg.

Application February 25, 1935, Serial No. 8,077

1 Claim. (Cl. 306—41)

Heretofore it has been the general custom in the manufacture of devices of this kind to provide a shank having a handle receiving socket disposed therein that is comprised of a single piece of metal and where a crooked handle was to be inserted within the shank it was necessary to bend or form the handle to conform to the crook in the shank.

I make my shank of two independent units, forming top and bottom sections that precisely fit and engage each other on their medial lines. The socket for the handle being and having uniformly tapering walls to permit the placing of a straight handle within the socket of the shank. The tool end of the shank members downwardly extend, and a socket is disposed therein into which the shank of the tool is to be fitted.

I preferably make the top member of the split shank longer on the handle end than the bottom member in order that a fastening screw or rivet may be passed therethrough into the handle. In order that a tight working relation may be maintained between the handle and the shank I provide a fastening screw of the conventional type. The screw passes through a pair of washers having sloping faces. The tapering faces of the washers are made to engage sloping faces of the respective shank members so that as pressure is applied in tightening the screw a longitudinal movement will be imparted to the washers and to the shank through which the screw passes to thereby maintain the tool in tight working relation with the shank.

The primary purpose and object of my invention consists in providing a shank for forks, shovels and the like that are made of independent members to lessen the cost of production of the same and to finally provide a shank having a downwardly extending offset at its front end into which a straight handle may be secured. In so making the device in the event of the breaking of the handle a new handle may be inserted thereinto without the loss of the shank and the fork, as is the general custom at the present time.

In making a shank embodying my new and improved principle, it is possible to insert a handle thereinto having a straight longitudinal center line thereby eliminating the necessity for steaming or heating the handle when it is to be placed into an offset shank.

The steaming and heating of the handle lessens its life and lessens its strength and at the same time increases the cost of production of the same.

The shank comprised of two members may be more cheaply made and in the event of breaking one of the same, the broken half may be replaced without the loss of the other half. The ferrule disposed upon the end of the pair of shank members when the same are secured together is loose and is slidable longitudinally of the shank. The walls of the shank and of the ferrule are tapering to thereby facilitate the tightening of the ferrule as the same is moved longitudinally of the shank.

A still further object of my invention consists in providing a shank that may be made in an ordinary casting foundry or in a drop forging plant with a minimum of tooling preparation.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a side view of my new and improved shank assembly having a fork disposed at one end and a handle secured to the other.

Fig. 2 is a sectional side view of the shank.

Fig. 3 is a perspective plan side view of the bottom portion of the shank.

Fig. 4 is a vertical sectional side view of the top and bottom portions of the shank.

Like reference characters refer to like parts throughout the several views.

I preferably make my shank of a top member 1 and a bottom member 2. The top and bottom members are fitted together on their medial sides as shown on line 3 in Fig. 2. I preferably make the top member longer than the bottom one to provide a tip 4 that has a hole 5 disposed therein. The purpose of the hole 5 is to permit the passing of a fastening screw 6 therethrough without the necessity of passing the same entirely through the handle 7. The top and bottom members have uniformly tapering side walls to permit the placing of the tapering end of the handle 7 thereinto. Shoulders 8 and 9 are disposed upon the respective shank sections against which the inner end of the handle is made to come to rest. The front end 10 of the top and bottom portions of the shank is offset and downwardly extends so that the longitudinal center line of the respective handle members, while continuous is not a straight line.

A ferrule 11 is removably secured to the tool enagaging end of the top and bottom shank members. The ferrule is loose and is adapted to be moved longitudinally of the shank to thereby maintain a tight fitting working relation between the ferrule and the shank and between the shank members and the shank 12 of the tool 13 that is to be fitted thereto.

When the top and bottom members of the shank are fitted to each other and the ferrule is in place a recess 14 is disposed therein that is rectangular in cross sectional area and the shank 12 of the tool to be fitted thereto is precisely formed to fit the side walls of the shank. The holes 15 and 16 are disposed in registry with each other. The holes 15 and 16 are formed within the respective top and bottom shank members and faces 17 and 18 of the holes are sloping faces. Wedge shaped washers 19 and 20 are fitted to the holes and the sloping faces of the washers are made to engage and fit the sloping faces 17 and 18 of the holes. A fastening screw 21 passes through the respective shank members and through the washers and as the nut 22 of the screw is tightened a longitudinal movement will be imparted to the shank 12 through which the screw passes as the same is tightened.

This end movement of the shank 12 causes the shank to engage the ferrule 11 and/or to engage the ends of the shank members 1 and 2. Ribs 23 and 24 are disposed within the respective shank members. The rib strengthens the shank as the cross sectional area of the shank decreases. The surfaces 26 and 27 of the lower shank lie in a common plane and the two may be surfaced simultaneously on any suitable abrasive disc. Likewise the faces 28 and 29 lie in a common plane and may be surfaced in the same manner. The faces of the oppositely disposed or upper shank member also may be faced upon a surfacing disc. A fastening element as a rivet 30 passes through the respective shank members and through the handle 7.

In order to remove the handle from the respective discs it is only necessary to remove the screw 6 and the fastening 30 and since the shank members are companion members and are separable a tight relationship may be maintained at all times between that portion of the handle that is inserted within the socket 31 of the respective shank members and that portion of the handle that is inserted within the socket 31.

I claim:

In a device of the class described, the combination of a pair of complementary shank forming members, so made that when they are secured together a handle receiving socket is disposed at one end and a tapering tang receiving socket is disposed at the opposite end into which the tang of a pitch fork may be inserted, a ferrule removably secured to the small end of the shank forming members for locking the shank forming members together, the longitudinal center line of the shank at the handle receiving end lying in a different plane than that of the longitudinal center line of the oppositely disposed end of the handle receiving end, said shank members having tapered slots therethrough adjacent the fork and in alignment with each other, tapered washers disposed in the tapered slots and a bolt disposed through the tapered washers and the tang of the fork to secure the same together.

JOSEPH A. BARTOSZ.